June 2, 1942.　　D. C. HUNGERFORD　　2,284,824
ANCHOR NUT AND THE MANUFACTURE THEREOF
Filed May 26, 1938　　3 Sheets-Sheet 1
Fig. 5
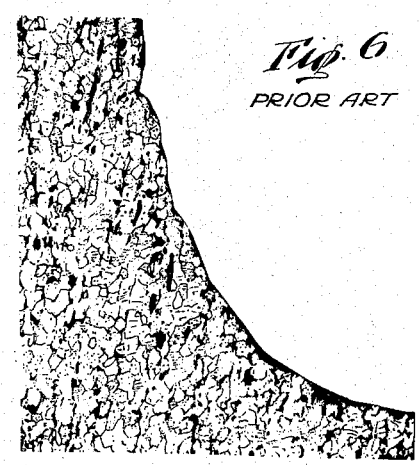
Fig. 6
PRIOR ART
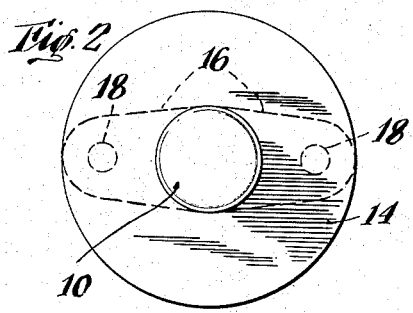
Fig. 2
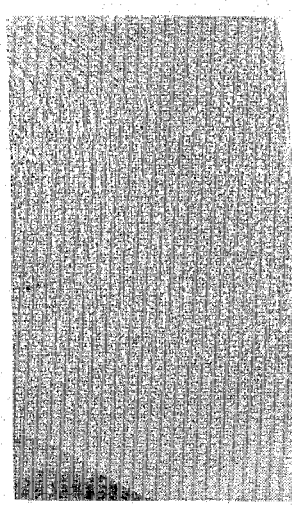
Fig. 4
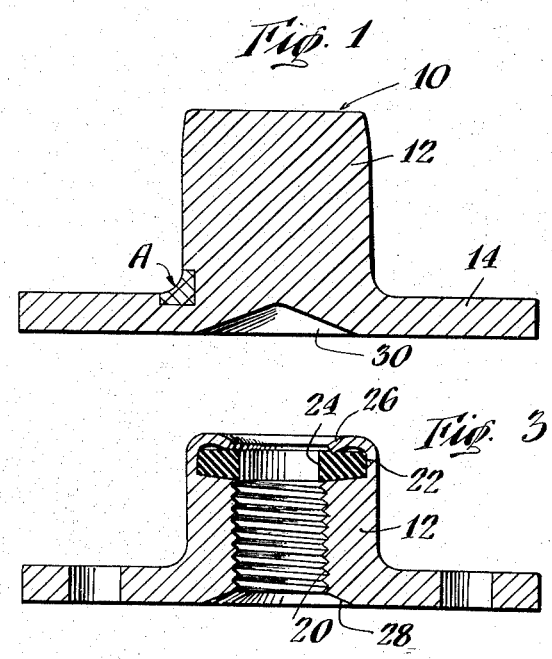
INVENTOR
Daniel C. Hungerford
his ATTORNEY

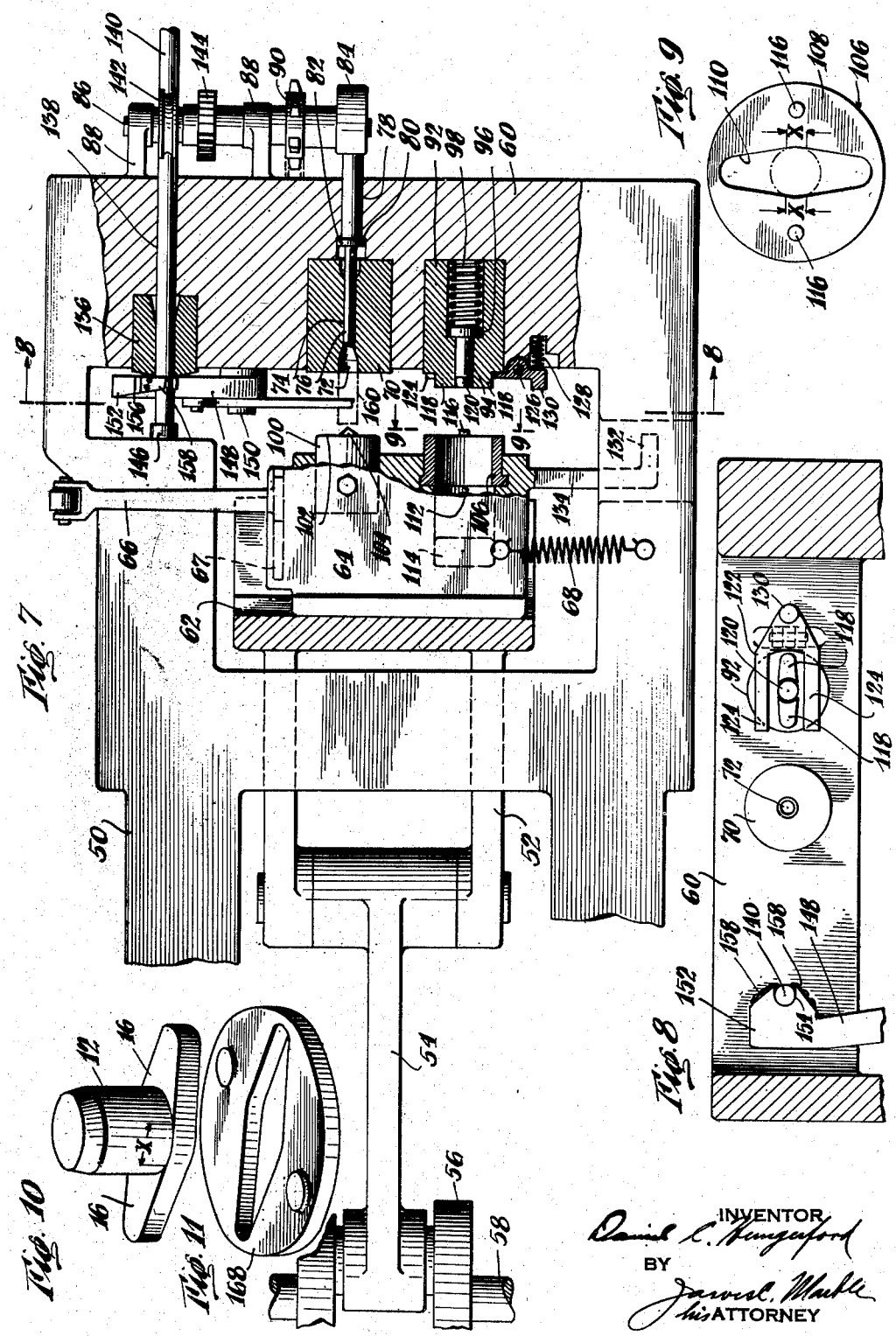

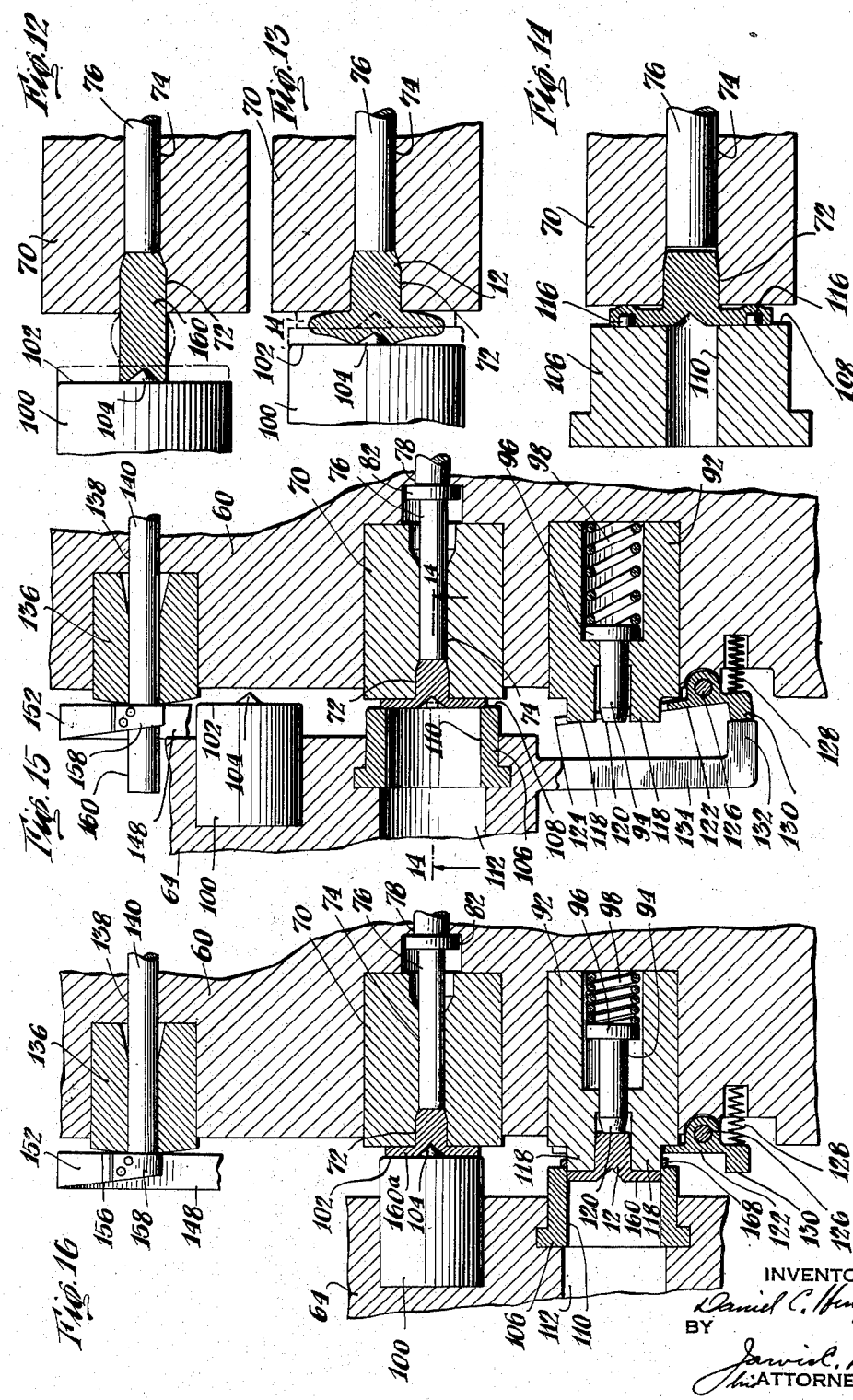

Patented June 2, 1942

2,284,824

UNITED STATES PATENT OFFICE 2,284,824

ANCHOR NUT AND THE MANUFACTURE THEREOF

Daniel C. Hungerford, Madison, N. J., assignor to Elastic Stop Nut Corporation, Elizabeth, N. J., a corporation of New Jersey Application May 26, 1938, Serial No. 210,145

10 Claims. (Cl. 10—86)

The present invention relates to anchor nuts and has particular reference to anchor nuts of the self-locking type.

By the term anchor nut is meant any nut of the kind the form of which provides in addition to the main body portion of the nut, a laterally projecting flange portion, usually projecting from the base of the body portion of the nut, which flange portion provides one or more lugs or projections by means of which the nut may be held rigidly or with limited lateral movement with respect to a part to be fastened by a bolt and nut connection of which the nut forms a part. When such nuts are of the self-locking type, they provide, when anchored, a particularly advantageous and effective unit lock for bolts or screw fastenings of the so-called blind type in which the nut is inaccessible after assembly.

One of the most widely used forms of anchor nut is that in which the flange portion of the nut consists of two lugs or tabs projecting from opposite sides of the base portion of a central body portion, these lugs being provided with apertures for rivets or equivalent fastening elements for securing the nuts to a plate or other structure. These nuts further have widespread application in aircraft, where weight is a factor of material importance and on this account the nuts are made with tabs or projections which are comparatively of very thin cross-section. Also, on account of weight considerations, many nuts of this kind are made from light weight material of the nature of aluminum or magnesium or alloys thereof, the strength of which is relatively low.

Heretofore it has been the practice to make nuts of the kind under consideration from bar stock, the diameter of which is at least as great as the largest diameter across the flange portion of the finished nut, this bar stock being turned in automatic screw machines and the like to form the main body portion of relatively small diameter and a circular base portion of relatively very much larger diameter which is subsequently trimmed by a punch or like operation to give the desired finished outline for the flange portion. This procedure obviously involves a very large percentage of waste since the main body portion of the nut which is of small diameter has a height usually several times that of the thickness of the flange portion. Consequently, a major portion of the original bar stock is turned from its original diameter to a diameter which may be as little as one-third of the original diameter or even less, in order to obtain the relatively thin flange portion of large diameter from which the desired projections or tabs may be formed.

Furthermore, anchor nuts made in accordance with previously known methods have a grain structure which is substantially the same as to orientation and character throughout the entire body of the nut. Usually this orientation, due to the rolling of the bar stock from which the nut is made, is longitudinal of the bore of the nut, which means that it is transverse of the thin section of the flange portion of the nut body. The result of this is that the thin projecting tabs or flanges are relatively brittle. In many instances nuts of the character under consideration must be fastened to curved or other non-planar surfaces which require that the anchor lug or lugs be bent to conform to the contour of the surface to which the nut is secured. In cases of this kind trouble is frequently encountered with nuts as heretofore manufactured because of breakage from the main body of the nut of the anchoring lugs, due to their brittleness.

The general object of the present invention is to improve upon prior forms of anchor nut of the type under consideration and to provide an improved method for the manufacture thereof which will enable the cost of manufacture of the nuts to be very materially reduced and which will result in the production of nuts having superior qualities of strength and ductility.

The manner in which the above general object and other and more detailed objects of the invention may be attained will best be understood from a consideration of the ensuing portion of this specification and the accompanying drawings forming a part hereof in which:

Fig. 1 is a central vertical section through a nut blank representing an intermediate stage in the manufacture of an anchor nut embodying the present invention;

Fig. 2 is a top plan view of the blank shown in Fig. 1;

Fig. 3 is a section similar to Fig. 1 showing a completed self-locking anchor nut of preferred form, embodying the invention;

Fig. 4 is a photographic reproduction on greatly enlarged scale of a half section of a nut blank of the kind shown in Fig. 1;

Fig. 5 is a micrograph of approximately the area indicated by A on Fig. 1;

Fig. 6 is a micrograph of a similar area of an anchor nut blank made in accordance with prior methods;

Fig. 7 is a top plan view partly in section of a forging and trimming machine suitable for manufacturing nuts which embody features of the invention;

Fig. 8 is a section on line 8—8 of Fig. 7;

Fig. 9 is a view taken on line 9—9 of Fig. 7;

Fig. 10 is a perspective view of a trimmed nut blank;

Fig. 11 is a perspective view of the flash trimmed from the blank shown in Fig. 10; and Figs. 12 to 16, inclusive, are views showing the dies and punches of the machine of Fig. 7 in different operative positions.

In accordance with the present invention, the nut blanks from which the finished nuts of desired shape are formed are made from bar stock the diameter of which is of the order of the diameter of the main body portion of the nut to be formed and the flange portion of the nut blank is made by cold forging to produce initially a flange of generally circular outline and of relatively much larger diameter than that of the bar stock and of relatively very thin cross-section. This cold forging is effected by upsetting one end of a blank of suitable bar stock to produce a nut blank of the general form shown in Figs. 1 and 2.

The effect of this cold forging operation is to cold work and refine the grain structure of the raw metal which forms the upset portion of the blank. Also, the upsetting operation operates to orient the grain structure of the metal in the thin flange portion and at the junction of the flange portion with the main body portion so that in the flange the grain is oriented in the general direction of the plane of the flange while at the place of juncture between the flange and the main body portion, the grain structure is oriented along curved lines following the line of curvature of the fillet between these portions.

The refined character of the grain structure, with the above noted kind of orientation, is clearly illustrated in Figs. 4 and 5. From Fig. 4 the lines of orientation of the grain structure in the main body portion clearly appear substantially parallel to the axis of the nut body, this being the orientation as usually found, lengthwise of the bar stock. The refined grain structure of the flange and its orientation in the general direction of the plane of the flange is also clearly apparent from Fig. 4. The nature of the grain structure and orientation at the juncture of the flange with the body portion is even more clearly shown in Fig. 5 and from this figure it will be apparent that the structure provided is one which will afford maximum ductility and strength at the place where such strength is most needed, namely at the place of juncture between the very thin flange section and the body of the nut.

The great contrast between properties of a nut blank formed as above described in accordance with the present invention and a nut blank formed in accordance with prior methods which reduce the diameter of large sized bar stock by turning or other cutting operations to form the main body portion of the nut, will be evident from a comparison of Figs. 5 and 6. The latter figure illustrates the nature of the grain structure at the place of juncture of the flange and the main body portion in a nut blank made by cutting operations from bar stock of the same kind as that used for making the nut blank in accordance with the invention and a section of which is illustrated in Fig. 4. From Fig. 6 it will be noted that as it to be expected, the grain structure is oriented along lines generally parallel to the axis of the nut but in this case the orientation of the grain structure is in general the same throughout the blank so that the orientation is at right angles to rather than parallel to the plane of the flange.

After the nut blank, designated generally at 10, is brought to the form shown in Fig. 1 by the upsetting operation, the flange portion 14 is trimmed to desired shape as for example by shearing or otherwise cutting along the dotted lines 16 to provide two opposed tabs or lugs perforated as at 18 to provide for fastening the anchor nut to any desired part. Obviously, the flange may be trimmed and, if desired, in addition bent to provide any required form of projection for anchoring or otherwise securing the nut to any other member.

As previously pointed out, anchor nuts of the kind under consideration are of greatest practical advantage when such nuts are of the self-locking type and a preferred form of anchor nut made in accordance with the present invention is illustrated in Fig. 3, the body portion 12 of the nut being provided with a threaded bore 20 the upper end of which is recessed as at 22 to provide for the reception of an annular locking washer or insert 24 of non-metallic elastic material such as that commercially known as vulcanized fibre. The insert 24 is locked against rotation in the nut body by beading over the upper rim 26 of the nut body, or by any other suitable expedient for retaining the washer firmly in place in the nut body.

For nuts of the character under consideration it is desirable that the bottom of the bore be counter-sunk as indicated at 28. Heretofore, such counter-sinking has been effected by a separate operation in the manufacture of the nut. In accordance with the present invention such counter-sinking for the threaded bore may be advantageously effected without the necessity for a separate operation in the manufacture, by forming a depression or recess, as indicated at 30 in Fig. 1, in the bottom face of the nut blank simultaneously with and as a part of the flange forming operation.

The new and superior nut product resulting from my invention may be considered as one aspect thereof. Another aspect of the invention pertains to a novel and improved method for the manufacture of such nuts which will now be described.

Referring now more particularly to Figs. 7 to 9, the form of apparatus illustrated consists of a cold forging machine having a main frame 50 in which is mounted a reciprocating head indicated generaly at 52. Head 52 is connected by means of a connecting rod 54 to the crank pin 56 of shaft 58 which is driven from any suitable source of power. The frame 50 of the machine is provided with an extension 60 which in effect acts as a press bed for holding the dies hereinafter to be described, which dies function in effect as anvils cooperating with punch tools carried by the reciprocating head in the machine.

The head 52 is provided with transversely extending rails 62 upon which is slidably mounted for transverse reciprocation a tool holder 64 which is moved back and forth between two transverse terminal positions through the medium of an actuating rod 66 having a head slidably engaged between suitable side rails 67 on the tool holder 64 and connected to suitable driving mechanism (not shown) for effecting the transverse reciprocation of the tool holder in desired timed relation to the longitudinal reciprocation of the head 52. Many different mechanisms for effecting such relatively timed reciprocations are well known in the art and detailed description of such mechanism is not believed necessary to an understanding of the present invention. Usually such mechanisms embody cams shaped to give the desired motion and in the machine illustrated, in which the rod 66 may be actuated by such cam action, movement of the head in one direction may be effected by means of a spring 68.

The forging and trimming of the nut blanks is accomplished in two successive steps at two different stations in the machine. At the first station an upsetting die 70 is provided having a cavity 72 formed in the end of the die, which cavity is shaped to provide the contour desired for the main body portion of the nut to be formed. A bore 74 extends through the die in alignment with the cavity 72 and in this bore is located an ejector pin 76 reciprocably carried in a suitable bore 78 in the frame of the machine. The latter bore is counter bored to provide a shoulder 80 forming a stop against which collar 82 on the ejector pin abuts in the retracted position of the ejector pin. The ejector pin is reciprocated by means of a cam 84 rotatably mounted on a shaft 86 carried by brackets 88 mounted on the frame of the machine. Cam 84 is actuated in timed relation to the reciprocation of the tool holder 64 by any suitable mechanism. In the example shown, a sprocket wheel 90 is indicated.

At the second station, where the trimming operation is effected, a die 92 is carried in the frame of the machine, this die having a resiliently loaded ejector pin 94 provided with a collar 96 seating against a shoulder in the bore of the die to limit the movement of the pin toward the face of the die. Movement of the pin 94 away from the face of the die is resisted by spring 98 which, as will be noted from Fig. 7, will permit only very limited retractive movement of the pin 94 before a positive stop to such movement is effected because of contact of the convolutions of the spring with each other. Other means for resiliently holding the pin 94 in its projected position may be employed, such for instance as very dense rubber or other compressible substance. The essential feature of the resilient backing of pin 94, as will hereinafter more fully appear, is that it will exert a force of high value on the pin.

The tool holder 64 carries two punches adapted to cooperate with dies 70 and 92. Punch 100 constitutes a forging punch arranged to cooperate with die 70 to upset a blank on a working stroke of head 52 when the tool holder is in the position shown in Fig. 7. This punch has a flat working face 102 in the center of which there is preferably provided, for the purpose of forming the recess 30 described in connection with Fig. 1, a central projection 104.

Punch 106 constitutes a trimming punch adapted to cooperate with die 92 on the working stroke of head 52 to trim a blank, and further adapted to act as a transfer member for picking up a blank from die 70 and transferring it to the second station for the trimming operation. Punch 106 is hollow and the face 108 of the punch has a cutting edge 110 (Fig. 9) shaped to trim, in cooperation with die 92, a flange portion of desired configuration. For trimming an anchor nut of the form indicated in Fig. 2, the bore through punch 106 is of generally oval cross-section as seen in Fig. 9. The tool holder 64 is provided with an internal passage or bore 112 with which the bore through the punch 106 communicates and which is adapted to discharge through the downwardly extending outlet 114, the nut bodies trimmed at this station of the machine.

The face of punch 106 is provided with two diametrically opposed projections 116 which serve as pickup fingers for picking up a blank formed at the first station and transferring the blank to the trimming station.

Referring again to die 92, the face of this die, for trimming a nut of the shape under consideration, is provided with two shearing projections 118 and the shape of which, as will be observed from Fig. 8, is the same as that of the laterally extending lugs or tabs 16 (Fig. 10) which are to be formed on the nut body. These projections lie at opposite sides of the bore in which the pin 94 is situated, the cross-sectional contour of this pin being substantially the same as the cross-sectional contour of the main body portion of the nut. As will be observed from Fig. 8, the end face 120 of pin 94 substantially entirely fills the space between the confronting faces of the two spaced projections 118.

Associated with die 92 is a stripping mechanism for stripping the trimmed-off portion of the nut blank from the die 92 after the trimming operation has been effected. In the embodiment illustrated, this stripping mechanism comprises a forked stripping member 122, the spaced fingers 124 of which embrace the projections 118 on the die. Member 122 is pivoted at 126 and is resiliently held against the face of the die by means of a spring 128. Member 122 is in the form of a lever pivoted intermediate its ends and the arm opposite the fingers 124 is provided with a contact face 130 adapted to be struck by the end face 132 of a stripping arm 134 carried by the tool holder 64.

In addition to the punches and dies for forging and trimming the nut blanks from the bar stock, the machine is also provided with mechanism for cutting the bar stock into individual pieces of desired length, which pieces may for convenience be referred to as slugs, and for transferring the slugs to proper position with respect to die 70 for the forging operation.

This mechanism comprises an annular shearing die 136 fixed in the frame of the machine with the bore through the die in alignment with a bore 138 extending to the exterior of the frame of the machine. The bar stock 140 is fed through bore 138 and the bore of die 136 by means of any suitable step feeding mechanism of known character. In the embodiment illustrated, this mechanism is indicated by friction feed roller 142 cooperating with a similar roller (not shown) beneath bar 140, roller 142 being secured to a member rotatably mounted on shaft 86 and carrying a ratchet wheel 144 adapted to be actuated by a pawl mechanism, not shown. Opposite the bore of die 136, the frame of the machine provides a stop 146 against which the bar stock is fed to provide a projecting length of stock of predetermined length, between the face of the stop 146 and the face of die 136.

The projecting length of bar stock is sheared by means of a shearing and transfer arm 148 pivotally mounted at 150 and actuated in suitably timed relation to the remaining mechanism by cam or other like mechanism, not shown. In the embodiment illustrated, this arm has a head 152 provided with a laterally opening recess 154 adapted to embrace the slug which is cut from the bar stock by the shearing edge 156 of the arm as it passes the face of die 136. Spring fingers 158 are fixed to the head of the arm, the ends of these fingers projecting past the edges of the recess 154 to retain the slug in the recess during the transfer motion. The cam or other mechanism for swinging arm 148 is arranged to swing the arm after the shearing operation to place the slug 160 in the position shown in dotted lines in Fig. 7, in which the slug is held by the arm in alignment with the recess 72 in die 70.

The sequence of operations is as follows, it being assumed that a slug has been cut from the bar stock and transferred to the position shown in dotted lines in Fig. 7. With the tool holder in the position shown in Fig. 7, a working stroke of the head 52 is effected and the slug 160 is upset between punch 100 and die 70 to form a blank of the kind indicated in Fig. 1 and consisting of the solid body portion 12 and the generally circular flange portion 14. In the center of this flange portion the recess 30 is formed by the projection 104 on the face of punch 100. The manner in which the lines of orientation of the grain structure are forged to the ultimate positions indicated by Fig. 4 will be apparent from a consideration of Figs. 12 and 13 showing the progressive positions of the punch 100 on its working stroke.

The swinging movement of the shearing and transfer arm 148 is timed in relation to the working stroke of the tool holder 64 so that as the punch 100 moves forward on its working stroke and after the slug is held between the punch and the die but before the punch reaches a position on its working stroke where it would strike the transfer arm, the latter is retracted toward its shearing position, the spring fingers 158 flexing to release the slug which is now rigidly gripped between the punch and die.

During the working stroke of the punch 100 and on the return stroke thereof after the upsetting operation, the ejector pin 76 remains in the position shown in Figs. 12 to 14, and the forged slug remains in die 70. During or after the completion of the return stroke of the head 52 the tool holder 64 is moved transversely so that the die 106 is brought into alignment with die 70 as shown in Figs. 14 and 15. The head 52 then makes a working stroke with the tool holder in this position and this working stroke constitutes an idle stroke for the punch 100 as may be seen from Fig. 15. At the end of this working stroke the projections 116 on punch 106 are forced into the metal of the flange portion of the blank as indicated in Fig. 14. On the return from this working stroke, the ejector pin 76 is actuated by cam 84 so as to insure the loosening of the blank from the die and the retention of the blank on the face of punch 106 by the projections 116 embedded in the metal of the blank.

Before the next working stroke of the punch, the tool holder is returned by its actuating mechanism to the position shown in Figs. 7 and 16, with punch 100 again in alignment with die 70 and with the punch 106, now carrying an upset blank, in alignment with die 92.

Also, during this portion of the cycle of operation, the shearing and transfer arm 148, and the feeding mechanism for feeding the bar stock, are actuated so that a new slug is cut from the bar stock and transferred by the arm 148 to a position in alignment with the recess 72 of die 70. On the next succeeding working stroke, punch 100 operates to forge the new slug in the manner previously described, and simultaneously the die 92 and punch 106 cooperate to trim the flange portion of the upset blank which has been carried to the trimming station by the punch. These simultaneous operations are indicated in Fig. 16 illustrating the end of this working stroke, which has operated to trim a blank 160 at the second or trimming station while simultaneously forging a succeeding blank 160a at the first or forging station. As will be observed from Fig. 16, the projections 118 on the face of die 92 force the trimmed blank into the bore of the hollow punch 106, the trimmed-off part or flash of the flange portion of the blank, the appearance of which is indicated in Fig. 11, remaining on the projecting part of the die as indicated at 168 in Fig. 16.

It will be evident that as the punch 106, carrying the blank 160 on its face, approaches die 92 on its working stroke, the projecting body portion 12 of blank 160 will come into contact with the face of the resiliently backed pin 94 and pass between the projections 118 on the die. In order to satisfactorily accomplish the shearing operation without undesirable distortion of the flange portion of the blank, it is important that the pin 94 be strongly backed to provide a substantially solid abutment for the head of the blank to bear against when the pin is in retracted position. The reason for this will be appreciated from a consideration of the punch and die structure as revealed in Figs. 8 and 9. From these figures it will be evident that the two projections 118 on die 92 and the cutting edge 110 of the opening in punch 106 provide cooperating shearing edges which insure a clean shearing cut of those portions of the perimeter of the base flange which project from the main body portion of the blank. Between the spaced projections 118 on the die, the flange portion of the blank is not supported by the die, the unsupported portion of the perimeter to be sheared being indicated at X in Figs. 9 and 10. Since at this portion of the perimeter the flange of the blank is trimmed immediately adjacent to the main body portion of the nut, this latter portion may in effect be utilized as a support to prevent distortion of the blank which might otherwise result from an attempt to shear the portions indicated at X by the corresponding portion of the cutting edge 110 without die support on the opposite side of the blank. With the head of the blank substantially rigidly backed by the compression of the resilient backing of the ejecting pin 94, sufficiently solid support is provided by the head of the blank along the lines X to insure clean shearing of the flange along these lines without distortion of the flange portion of the blank so that the base of the trimmed blank is not distorted by the shearing operation.

On the return from the working stroke effecting the shearing, the resiliently supported ejector pin moves out to insure release of the trimmed blank from between the die projections 118, the blank being carried back on the return stroke in the recessed punch and subsequently forced out of the machine through the passage 112 by subsequently sheared blanks.

On the next forward or working stroke in which the punch 106 is transferred to the position shown in Fig. 15 for picking up the next blank, which stroke is an idle stroke for punch 100, the stripping arm 134 on the tool holder comes into abutting contact with the stripping lever 122 to strip from the face of the die 92 the flash 168 which was sheared on the preceding working stroke of the machine.

From the foregoing description it will be evident that by the present invention there is provided an anchor nut structure of superior quality having improved metallurgical characteristics giving increased strength and ductility as compared with nuts of like character heretofore available, particularly when such nuts are formed of light and relatively weak metals.

Also, it will be evident that the invention provides a method whereby such nuts of improved quality may be produced very rapidly and cheaply with a minimum of manufacturing operations and with very much less waste of material as compared with processes heretofore employed.

As will be apparent to those skilled in the art, a wide variety of nut shapes may be fabricated and various changes and modifications in the details of the method and apparatus employed, without departing from the scope of the invention which is to be understood as not limited to that herein described and illustrated by way of example, but inclusive of or falling within the scope of the appended claims.

The apparatus herein disclosed but not claimed, forms the claimed subject matter of my divisional application Serial No. 421,559 filed on December 4, 1941.

What is claimed is:

1. The method of making anchor nuts having a main body portion and a laterally projecting flange portion which includes the steps of upsetting one end of a length of bar stock to produce a flange having a diameter at least equal to the maximum transverse flange dimension of the finished nut and during the upsetting operation forming a generally circular depression located centrally of the upset face of the material, trimming the flange to desired contour, forming a central bore of smaller diameter than the diameter of said depression extending from the upset face of the nut into the body portion thereof, and threading said bore, whereby to utilize the marginal portion of said depression as a counter-sink for the end of the threaded bore.

2. The method of making an anchor nut having a main body portion and a laterally projecting flange portion which includes the steps of supporting in a suitable die one end portion of a length of bar stock having approximately the transverse dimensions of the main body portion of the finished nut, cold forging the projecting end of said length by an upsetting operation with a suitable punch to form a generally circular and relatively thin flange, removing the blank so formed from the die, supporting the body portion of the blank in a suitable recess in a second die having one or more projections thereon corresponding in contour to the projecting portion or portions of the desired nut, and shearing the flange portion of the blank to desired contour by the aid of a hollow shearing punch cooperating with the last mentioned die.

3. The method of making anchor nuts having a main body portion and one or more projecting flange portions, the side edges of which are tangent to the body portion at the places of juncture, which includes the steps of forging a length of bar stock to form a blank having a main body portion and a generally circular upset flange portion, inserting the main body portion of the blank in a suitably recessed die providing substantially rigid axial support for the inserted end of the blank when the flange portion abuts against the face of the die, and trimming the flange portion to desired contour by the aid of a hollow shearing punch cooperating with projections on the face of the die corresponding to the desired projections on the nut while utilizing the axially supported body portion of the blank essentially as a die support for shearing the portion of the flange that is sheared immediately adjacent to the body portion and unsupported by the projections on the die.

4. The method of making an anchor nut having a main body portion and a laterally projecting flange portion, which includes the steps of shearing a slug of predetermined length from bar stock having transverse dimensions approximating those of the body portion of the finished nut, cold forging one end portion of the slug to form a generally circular laterally projecting flange portion having a depression located centrally of the face of the flange, forming a differential bore extending centrally through the blank, the smaller end of the bore being smaller in diameter than said depression and in alignment therewith and the opposite end of the bore providing a recess in said main body portion for the reception of a locking insert, and threading the portion of said differential bore of smaller diameter.

5. The method of making an anchor nut having a main body portion and a laterally extending flange portion which includes the steps of upsetting the end of a length of suitable stock by the aid of an upsetting die to form a blank having a flange a part of which is subsequently to be removed at a trimming station by a trimming die and punch and while the blank is in the upsetting die forcing a part of said punch into embedded engagement with the part of the flange subsequently to be removed and at a place on said part spaced from the line along which the part is to be subsequently separated from the remainder of the blank, carrying the embedded blank on the punch to the trimming station and thereafter trimming from the blank the part of the flange embedded on the punch.

6. The method of making an anchor nut having a main body portion and one or more laterally projecting anchoring lugs which includes the steps of upsetting the end of a length of suitable stock by the aid of an upsetting die to form a blank having a generally circular flange a part of which is subsequently to be removed at a trimming station by a trimming die and punch and while the blank is in the upsetting die forcing two separated parts of said punch into embedded engagement with parts of said flange lying in opposite quadrants thereof, carrying the embedded blank on the punch to the trimming station and thereafter trimming the flange to remove therefrom the parts in engagement with the punch and to form from the remainder the lug or lugs of desired contour.

7. The method of making a wrought metal cold forged anchor nut of metal and having a main body portion and a laterally projecting flange portion which includes the steps of supporting in a suitable die a portion of a length of bar stock of wrought light weight metal having its grain structure oriented generally longitudinally of the bar and having approximately the transverse dimensions of the main body of the nut to be made, upsetting the projecting end portion of said length by a cold forging operation with a suitable punch to form a generally circular and thin washer-like flange of densified and grain refined metal projecting outwardly from said supported portion by at least approximately the transverse dimension of the supported portion while maintaining the supported portion in its original condition whereby to provide a blank having a wide and relatively very thin flange portion at one end thereof in which the grain structure is substantially refined and densified as compared with the metal of the body portion and with the grain structure of the flange portion oriented substantially in the plane of the flange and curving at the place of juncture to merge with the longitudinally oriented and relatively coarse grain structure of the body portion, removing the blank so formed from the die, trimming the flange portion to desired contour to provide one or more anchoring projections extending laterally from the base of said body portion, and drilling and tapping the blank to provide a threaded bore portion therein adjacent to the flanged end.

8. A cold forged metal anchor nut, comprising a main body portion having a threaded bore therein, an integral relatively thin flange portion projecting laterally from the base of said body portion for a distance at least of the order of the diameter of said body portion and an integral juncture portion joining said flange portion to said body portion, said flange portion and said juncture portion consisting of cold forged metal having a refined grain structure, the grain structure in said main body portion being relatively unrefined and oriented generally axially of said body portion, said grain structure in said flange portion being oriented generally in the lateral direction of said flange, said grain structure in said juncture portion curving from said flange portion through said juncture portion to meet said unrefined grain structure in said body portion.

9. A cold forged metal anchor nut blank, comprising a main body portion, an integral relatively thin flange portion projecting laterally from the base of said body portion for a distance at least of the order of the diameter of said body portion and an integral juncture portion joining said flange portion to said body portion, said flange portion and said juncture portion consisting of cold forged metal having a refined grain structure, the grain structure in said main body portion being relatively unrefined and oriented generally axially of said body portion, said grain structure in said flange portion being oriented generally in the lateral direction of said flange, said grain structure in said juncture portion curving from said flange portion through said juncture portion to meet said unrefined grain structure in said body portion.

10. A cold forged metal anchor nut blank, comprising a main body portion, an integral relatively thin flange portion projecting laterally from the base of said body portion for a distance at least of the order of the diameter of said body portion, the end face of said body portion radially inwardly of said flanged end portion having a centrally located generally circular depression therein and an integral juncture portion joining said flange portion to said body portion, said flange portion and said juncture portion consisting of cold forged metal having a refined grain structure, the grain structure in said main body portion being relatively unrefined and oriented generally axially of said body portion, said grain structure in said flange portion being oriented generally in the lateral direction of said flange, said grain structure in said juncture portion curving from said flange portion through said juncture portion to meet said unrefined grain structure in said body portion.

DANIEL C. HUNGERFORD.